(12) United States Patent  
Layton, Jr. et al.

(10) Patent No.: US 9,897,430 B2  
(45) Date of Patent: Feb. 20, 2018

(54) SKATE BLADE EDGE MEASUREMENT SYSTEM

(71) Applicant: Velasa Sports, Inc., Acton, MA (US)

(72) Inventors: Russell K. Layton, Jr., Acton, MA (US); Gregory Scott Torrisi, Midlothian, VA (US)

(73) Assignee: VELASA SPORTS, INC., Acton, MA (US)

( * ) Notice: Subject to any disclaimer, the term of this patent is extended or adjusted under 35 U.S.C. 154(b) by 219 days.

(21) Appl. No.: 14/988,634

(22) Filed: Jan. 5, 2016

(65) Prior Publication Data

US 2017/0191817 A1    Jul. 6, 2017

(51) Int. Cl.

| G01B 3/56 | (2006.01) |
|---|---|
| G01B 5/24 | (2006.01) |
| G01B 5/28 | (2006.01) |
| G01B 5/25 | (2006.01) |
| G01B 3/04 | (2006.01) |
| G01B 5/245 | (2006.01) |

(52) U.S. Cl.
CPC ............... *G01B 5/28* (2013.01); *G01B 3/04* (2013.01); *G01B 3/566* (2013.01); *G01B 5/245* (2013.01); *G01B 5/25* (2013.01)

(58) Field of Classification Search
CPC . G01B 5/24; G01B 5/245; G01B 3/56; G01B 3/566
USPC .................................................. 33/533, 535
See application file for complete search history.

(56) References Cited

U.S. PATENT DOCUMENTS

| 1,639,580 | A | * | 8/1927 | Thompson | G01B 3/566 |
| | | | | | 33/437 |
| D139,700 | S | * | 12/1944 | Truhon | 33/562 |
| 5,345,688 | A | | 9/1994 | Allen | |
| 6,481,113 | B1 | * | 11/2002 | Brenner | A63C 3/00 |
| | | | | | 280/809 |
| 6,594,914 | B1 | * | 7/2003 | Babcock | A63C 3/10 |
| | | | | | 33/535 |
| 7,748,130 | B2 | | 7/2010 | McKenna | |
| 7,918,035 | B1 | | 4/2011 | Jarczewski | |
| 8,888,567 | B2 | * | 11/2014 | Allen | B24B 9/04 |
| | | | | | 451/383 |
| 2005/0188558 | A1 | * | 9/2005 | Zukerman | A63C 3/10 |
| | | | | | 33/535 |

OTHER PUBLICATIONS

International Search Report and Written Opinion of the International Searching Authority for International Application No. PCT/US2016/069565, dated Apr. 27, 2017.

* cited by examiner

*Primary Examiner* — Christopher Fulton

(74) *Attorney, Agent, or Firm* — Knobbe, Martens, Olson & Bear LLP

(57) ABSTRACT

An ice skate blade edge measurement device includes a measurement device frame and a measurement indicator. The measurement device frame defines at least one storage location for the measurement indicator such that, when not being used to measure an alignment of a pair of sharpened skate blade edges, the measurement indicator can be stored. One storage location can be on a front side of the measurement device frame away from a measurement location and another storage location can be on a back side of the measurement device frame.

21 Claims, 12 Drawing Sheets

SKATE BLADE EDGE MEASUREMENT SYSTEM

BACKGROUND

Field of the Invention

The present disclosure relates to a device for measuring edges of an ice skate blade following a sharpening operation.

Description of the Related Art

When ice skates are sharpened there is a need to measure the squareness, evenness or levelness of the resulting blade edges. Various devices have been used to determine squareness or levelness of surfaces on skate blades. Dial indicators can be placed against a surface to measure the perpendicularity of an object. Other devices for checking the squareness of a skate blade can include two-part devices that include a frame secured to the skate blade and a measurement bar for measuring the squareness of the skate blade edges relative to the frame. The usage of the measurement devices can be cumbersome, making it difficult for the user to secure the frame in position on the skate blade and at the same time keep the measurement bar in position. The user typically has one hand on the skate and needs to juggle the various pieces to apply the measurement device properly to the skate blade.

SUMMARY

The systems, methods, and devices of this disclosure each have several innovative aspects, no single one of which is solely responsible for the all of the desirable attributes disclosed herein.

In one embodiment, an ice skate blade edge measurement device includes a first portion and a second portion that is removably connectable to the first portion. The first portion provides a storage region and a reference relative to a vertical portion of a skate blade when in use. The second portion can be removably positionable within the storage region of the first portion when not in use for providing a measurement such that the first and second portions can be moved around together when not in use for providing a measurement, and the second portion providing a reference relative to a pair of sharpened edges of the skate blade when separated from the first portion and placed onto the pair of sharpened edges when in use for providing a measurement.

In some embodiments of the ice skate blade edge measurement device, the second portion is able to be secured in position in the storage region of the first portion when the second portion is not in use for providing a measurement. The second portion can be secured in position in the storage region of the first portion using at least one coupling component. The coupling component can be magnetic. The second portion can nest onto the first portion in the storage region. The first portion can be mounted to the skate blade for use while the second portion is secured in the storage region. The second portion can be removed from the first portion and positioned apart from but adjacent to the first portion when in use for measuring alignment of the pair of sharpened edges of the skate blade.

In some embodiments of the ice skate blade edge measurement device, the storage region of the first portion can be a long term storage region and the first portion also comprises a second storage region that is a short term storage region, the short term storage region being defined solely by a magnetic or ferromagnetic region and the long term storage region being defined by at least one or more mechanical members. The long term storage region can be defined by at least one magnetic or ferromagnetic region.

The first portion can comprise an attachment portion that can be used to removably connect the first portion to the skate blade in use such that a surface of the first portion abuts a side surface of the skate blade. The first portion can comprise at least one indicia and, when in use, relative alignment of the second portion and the indicia indicates a degree of alignment between the pair of sharpened edges of the skate blade.

In another embodiment, an ice skate blade edge measurement device includes a measurement device frame comprising: a skate blade mount configured to releasably couple the measurement device frame to a vertical surface of an ice skate blade in use; an elongate member connected to the skate blade mount, the elongate member having at least one measurement indicia, the at least one measurement indicia being configured to provide an indication of relative alignment between a pair of sharpened ice skate blade edges of the ice skate blade when a measurement indicator is positioned in a measurement position relative to the at least one measurement indicia; the measurement indicator comprising a magnet, the magnet being configured to magnetically position the measurement indicator on the pair of sharpened ice skate blade edges of the ice skate blade during measurement; and the measurement device frame comprising a storage region and the measurement indicator being removably connectable to the measurement device frame in the storage region when not in use during measurement. The blade mount comprises a skate engagement foot configured to engage the skate blade within a slot of the blade mount.

In some embodiments of the ice skate blade edge measurement device, the measurement device frame can comprise a ferromagnetic portion positioned at a first location on the measurement device frame and wherein the magnet of the measurement indicator is positioned such that, when the measurement indicator is positioned in the storage region, the magnet of the measurement indicator and the ferromagnetic portion of the measurement device frame are magnetically attracted to one another. The measurement indicator can comprise a first leg and a second leg, the first leg being perpendicular to the second leg, wherein: when in a measurement position, the first leg of the measurement indicator is positioned adjacent to, but spaced apart from, the elongate member and the second leg abuts the pair of sharpened ice skate blade edges of the ice skate blade and, when in the storage position, the first leg is positioned adjacent to the elongate member and the second leg is spaced apart from the pair of sharpened ice skate blade edges of the ice skate blade. The first leg of the measurement indicator can be positioned adjacent to a forward surface of the elongate member when the measurement indicator is in the storage position. The first leg of the measurement indicator can be positioned adjacent to a rearward surface of the elongate member when the measurement indicator is in the storage position. The measurement device frame can further comprise one or more support members positioned on a backside of the elongate member, the one or more support members defining slots configured to receive a first leg of the elongate member, and wherein in the storage position the first leg can be positioned within the slots and the second leg can be positioned adjacent a portion of the elongate member.

An embodiment of a method comprising: releasably coupling a measurement device frame to an ice skate blade, the measurement device frame comprising at least one measurement indicia and a storage location for a measurement indicator; removing the measurement indicator from the storage location on the measurement device frame; and magnetically positioning the measurement indicator on a skate blade edge of the ice skate blade with a magnet disposed on the measurement indicator, wherein the measurement indicator is positioned relative to the at least one measurement indicia on the measurement device frame and wherein a measurement of the ice skate blade edge is based, at least in part, on a location of the measurement indicator relative to the at least one measurement indicia of the measurement device frame.

In some embodiments, the method further comprises returning the measurement indicator to a storage located on the measurement device frame by bringing into magnetic connection the magnet of the measurement indicator and a ferromagnetic component of the measurement device frame. The method can further comprise magnetically positioning the measurement indicator at a second storage location, wherein the second storage location is based at least in part on a magnetic attraction between the magnet and the ferromagnetic component, wherein the second storage location is different from the first storage location.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

The present disclosure relates to devices and methods that overcome deficiencies of prior art methods and devices for measuring squareness, evenness, or levelness of sharpened edges of ice skate blades. The devices and methods provide simple but effective means to measure the squareness, evenness, or levelness of the blade edges of an ice skate blade after skate sharpening has been performed. Moreover, the devices and methods provide alternatives to cumbersome measurement devices and provide high accuracy measurement systems that can be easily positioned and manipulated by a user. In some embodiments, positioning, measurement, and release of the measurement can be performed using only one hand on the device such that the other hand can be maintained on the skate.

Figure 1:
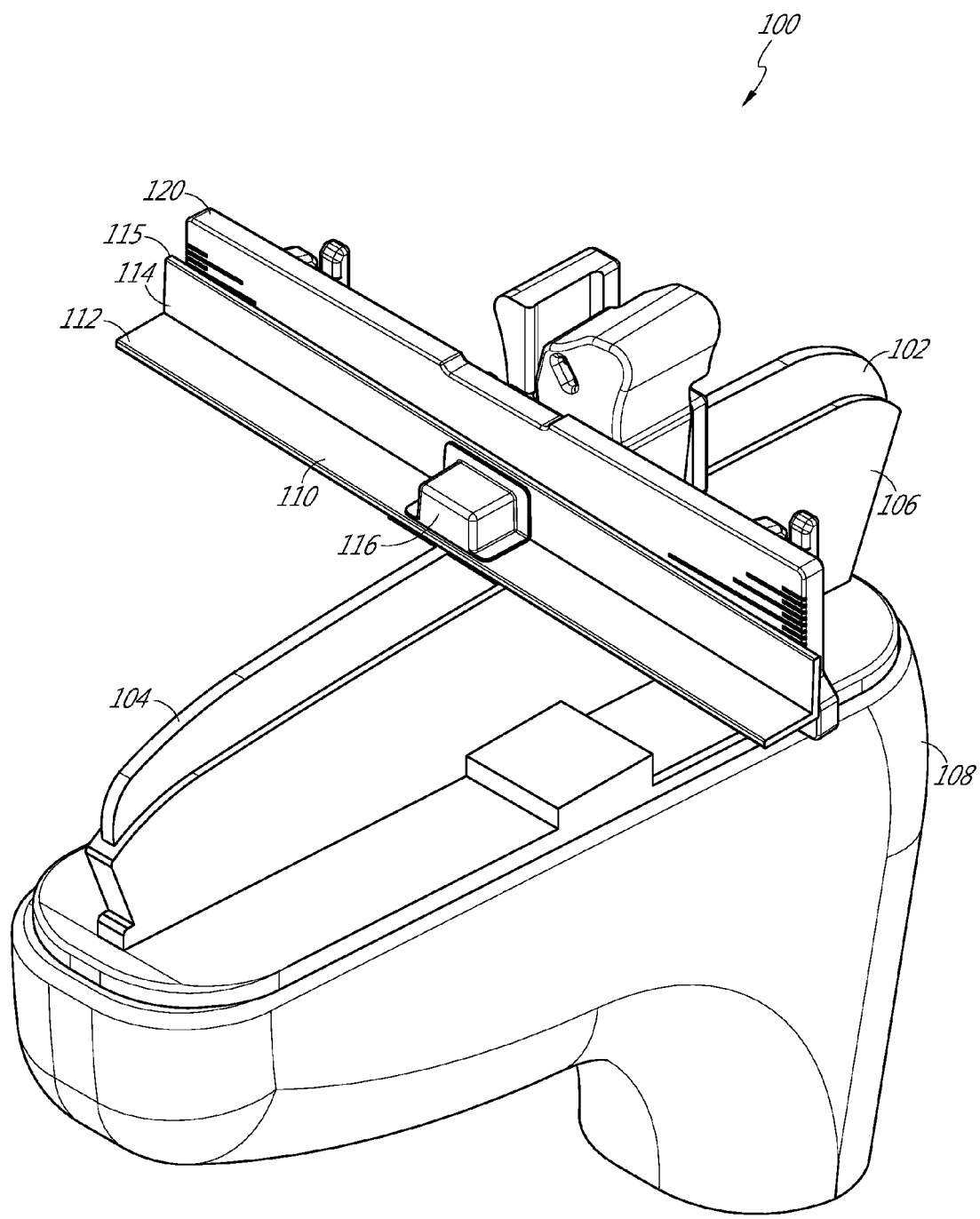
FIG. 1 illustrates an embodiment of a skate blade measurement device mounted on a skate blade.

FIG. 1 illustrates an embodiment of a skate blade measuring device 100. The skate blade measuring device 100 can be configured to measure the squareness, evenness, or levelness of the sharpened edges of an ice skate blade 102. The ice skate blade 102 has a pair of blade edges that define a blade end 104 and a pair of side surfaces that extend to the blade end. When the pair of blade edges are not square, even, or level with each other relative to the blade side surfaces, the performance of the blade on ice can be less that optimal. The ice skate blade 102 is mounted in a blade holder 106 which is mounted to an ice skate boot 108.

The skate blade measuring device 100 can include a measurement indicator 110 and a squaring frame 120. In the illustrated embodiment, the measurement indicator 110 is positioned adjacent to the squaring frame 120. The squaring frame 120 can be removably coupled or mounted to the ice skate blade 102. The squaring frame 120 generally has at least a portion that mounts to the side surface of the ice skate blade. When mounted, the squaring frame 120 provides a frame of reference relative to the side surface of the ice skate blade.

During checking of the skate blade edges at the blade end 104, the measurement indicator 110 can be positioned in a measurement position relative to the squaring frame 120. In the measurement position, the measurement indicator 110 can be positioned on edges of the blade end 104 and adjacent to the squaring frame 120 as illustrated in FIG. 1. The squaring frame is referenced from a vertical portion (e.g., side surface) of the skate blade while the measurement indicator is referenced from the edges of the blade end 104 and, therefore, if one edge is taller than the other, the discrepancy will be shown as a misalignment between the squaring frame 120 and the measurement indicator 110.

Although the squaring frame 120 is shown positioned in a middle location on the skate blade 102, the squaring frame 120 can be positioned at any point along the length of the skate blade 102. As will be discussed in greater detail below, the squaring frame 120 can be slidably coupled or secured to the skate blade 102, which allows the squaring frame 120 to be moved to different positions along the skate blade 102 without decoupling or removing the squaring frame 120 from the skate blade 102. The measurement indicator 110 also can be moved into position relative to the squaring frame 120 at each position.

Figure 5:
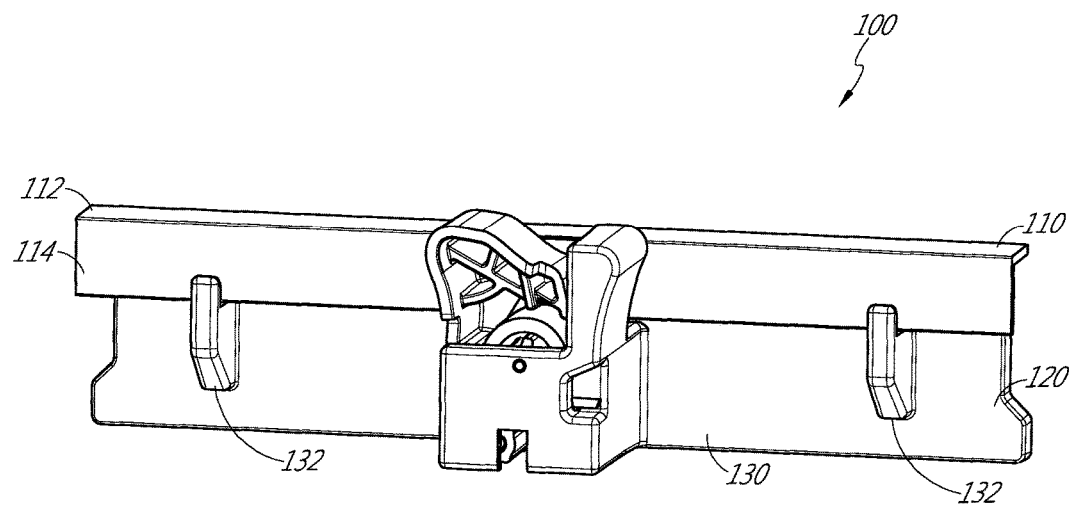
FIG. 5 illustrates a back perspective view of the embodiment of the skate blade measurement device with the measurement indicator in a backside storage position.
Figure 6:
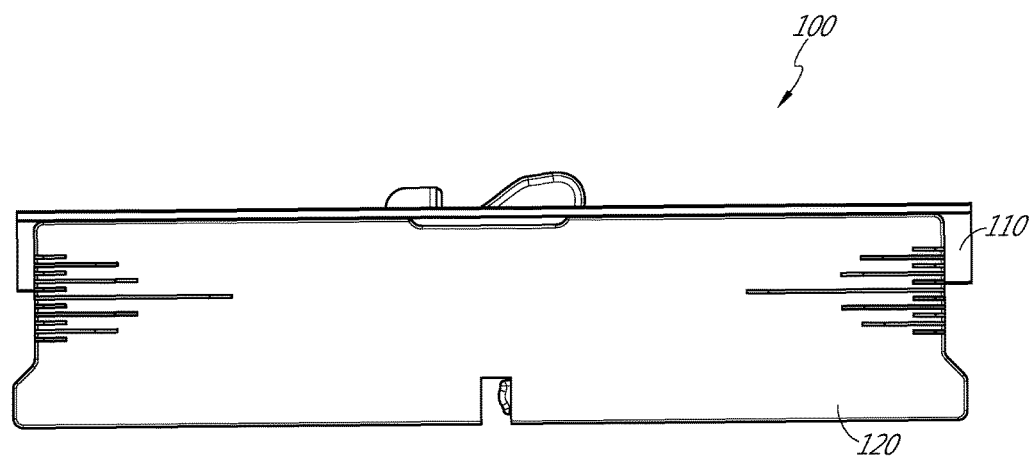
FIG. 6 illustrates a front view of the embodiment of the skate blade measurement device with the measurement indicator in the backside storage position.
Figure 7:
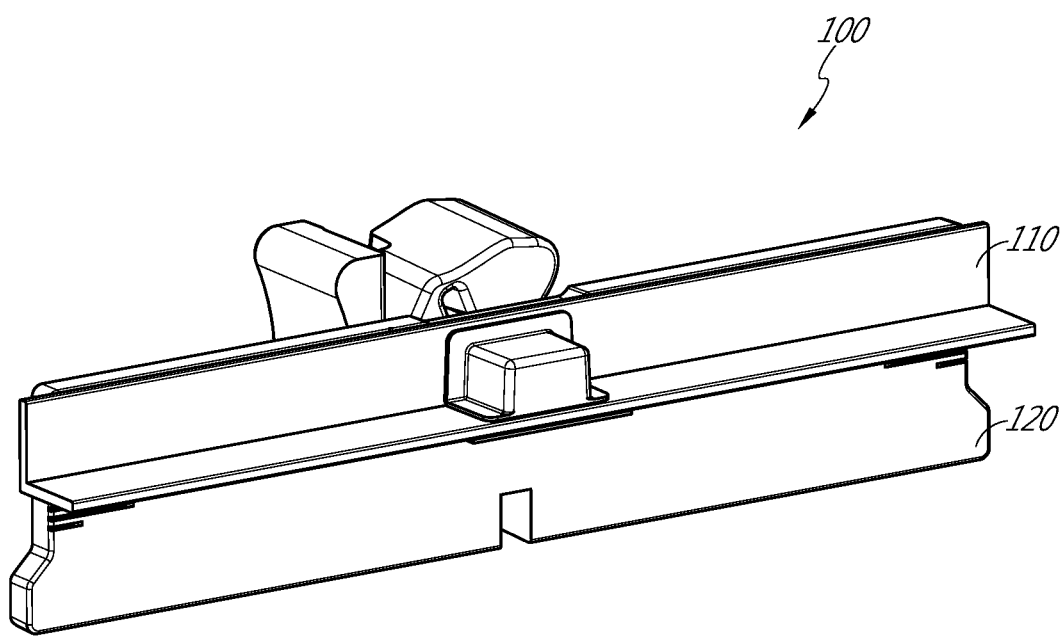
FIG. 7 illustrates a front perspective view of the embodiment of the skate blade measurement device with the measurement indicator in a front side storage position.

After performing measurements at one or more locations along the skate blade 102, the measurement indicator 110 can be positioned in, and secured in, a storage position on the squaring frame 120. In some configurations, one or more mechanical components can help to define the storage position. For example, an embodiment of a backside storage location for the measurement indicator 110 is illustrated in FIGS. 5 and 6, and an embodiment of a front side storage location for the measurement indicator 110 is illustrated in FIG. 7. These storage locations will be described in greater detail below.

The storage location for the measurement indicator 110 can be such that the measurement indicator can be removed after the squaring frame 120 is mounted to the skate blade 102. In other words, the measurement indicator 110 and the squaring frame 120 can be configured such that they can remain together while the squaring frame 120 is mounted to the skate blade 102 and then separated from use in the measurement operation. Such a configuration facilitates one-handed use of the device so that the other hand remains free to support the skate or skate blade. Moreover, in some configurations, the user can move the measurement indicator 110 between the measurement and storage positions without separating the squaring frame 120 from the skate blade 102. In some embodiments, the skate blade measuring device can include a short term storage location (such as the front side storage location) and a long term storage location (such as the backside storage location). In such an embodiment, the short term storage location may be used to temporarily store the measurement indicator between measurements of skate blades, whereas the long term storage location may be used when the skate blade measuring device is no longer in use.

Measurement Indicator

The measurement indicator 110 is described with reference to FIGS. 1-7 and 15-20. The measurement indicator 110 can also be referred to as a pivoting bar. The measurement indicator 110 includes elongate members 112, 114, also referred to as legs. The elongate members 112, 114 can be positioned substantially perpendicular to each other to form an L-shaped bar. The elongate members 112, 114 can be positioned at approximately a 90° angle relative to each other. In some configurations, the lower elongate member 112 can be significantly shortened and need only extend a sufficient length to accommodate the skate blade edges of the end of the skate blade. In some configurations, the upper elongate member 112 can be formed of two short portions that can interface with the squaring frame 120 in manners to be described below. For example, two upwardly extending tabs at laterally outward locations can be used rather than having the elongate member 112 extending the full length.

Figure 2A:
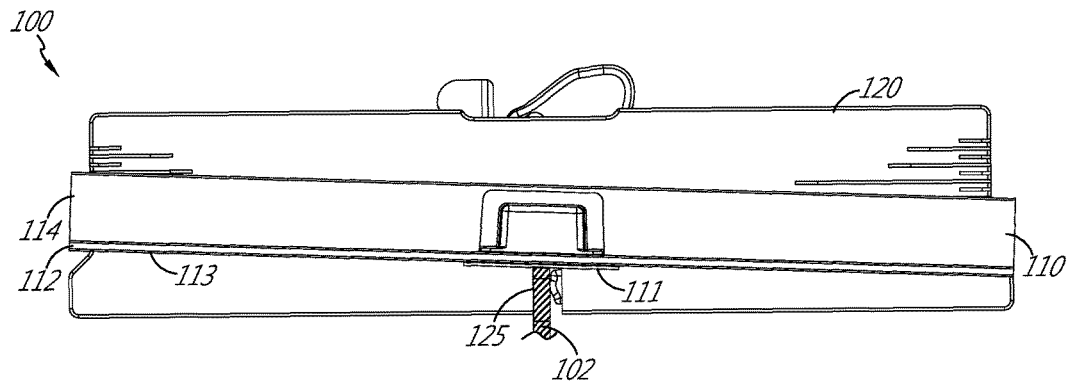
FIG. 2A illustrates a front view of the embodiment of the skate blade measurement device mounted on the skate blade.

As shown in FIG. 2A, a plate 111 can be positioned on a bottom face 113 of the elongate member 112. A magnet housing 116 can be positioned substantially at the center of the measurement indicator 110. A magnet 118 can be disposed within the magnet housing 116. The magnet 118 can be positioned vertically above the plate 111. The plate 111 can extend laterally outward of the magnet 118 and the magnet housing 116. In some configurations, the magnet 118 can be mounted to the measurement indicator 110 without the use of the magnet housing 116.

The plate 111 can help secure the measurement indicator 110 in position on the edges of the end of the blade. The magnet 118 can facilitate attachment of the leg 112 on top of edges formed on the blade end 104 while the measurement indicator 110 is in the usage position. The usage position can also be referred to as a measurement position. In the usage position, the leg 114 can be positioned substantially parallel to face 123 of the elongate member 122 of the squaring frame 120, and leg 112 can be positioned substantially perpendicular to the face 123 of the elongate member 122 of the squaring frame 130.

The magnet 118 also can facilitate attachment of the measurement indicator 110 to the squaring frame 120 in the storage position. An embodiment of the backside storage position is illustrated in FIGS. 5 and 6 and an embodiment of the front side storage position is illustrated in FIG. 7. While the magnet 118 is disclosed as helping to facilitate attachment of the measurement indicator 110 to the squaring frame 120 in the storage position, it is possible to use mechanical latches, assemblies, mechanisms or other suitable configurations that facilitate coupling of the measurement indicator 110 to the squaring frame 120 during storage (i.e., when the measurement indicator 110 is not be used to measure the alignment of the edges).

The magnet housing 116 and/or the magnet 118 may be attached to the measurement indicator 110 using any suitable manner, such as through the use of an adhesive, interference or snap-fit or the like. The magnet housing can be secured to the leg 112 and/or the leg 114. The leg 114 has a top edge 115, which can used to determine squareness in conjunction with the squaring frame 120. The elongate legs 112 and 114 can be configured to amplify the height variation between skate blade edges formed on the blade end 104 by being positioned laterally outward of the skate blade edges being checked. The further laterally outward the readings are taken, the greater the amplification of the reading.

Squaring Frame

Figure 8:
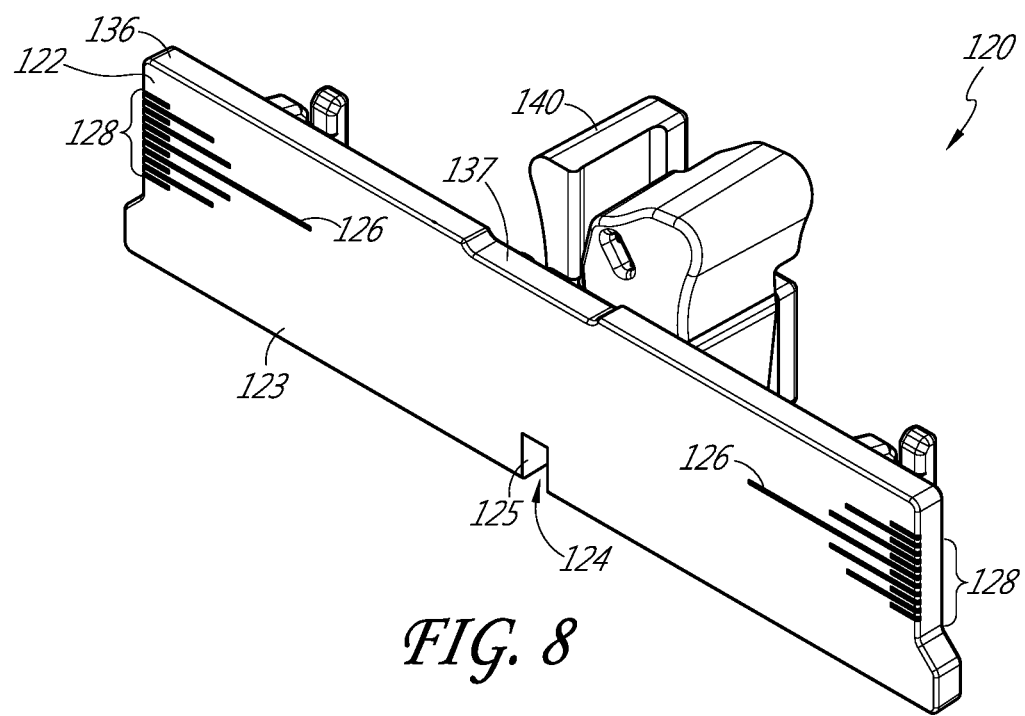
FIG. 8 illustrates a front perspective view of the embodiment of the squaring frame.

The squaring frame 120 is described with reference to FIGS. 1-14. As shown in FIG. 8, the squaring frame 120 includes an elongated member 122 and a frame body 140. The frame body 140 extends outwardly from a back face 130 of the elongated member 122 and generally bisects the width thereof. The frame body 140 and/or elongated member 122 may include a blade engagement slot 124 that extends therethrough. In some configurations, the slot 124 is defined only through the frame body 140. In some configurations, the slot 124 is defined only through the elongated member. The height and width of the blade engagement slot 124 can be sized and shaped to receive the skate blade 102. At least one wall of the slot is used to reference from the side of the skate blade. Accordingly, in some configurations, the wall is provided instead of a full slot.

A front face 123 of the elongate member 122 can include a one or more indicia 128, such as graduations, on the face 123. The graduation(s) 128 can include squaring indicia 126 (e.g., lines, shapes, openings, holes, apertures or other features that allow a user to see or visualize the squareness, evenness, or levelness of the edges). Any number of indicia or graduations and any spacing of indicia or graduations can be used.

At least one squaring indicia 126 can be positioned on the face 123 such that, when the skate blade 102 is inserted into the slot 124, the squaring indicia 128 will be perpendicular to the side surface of the skate blade 102. In some embodiments, the distance from the squaring line 126 to the top of the slot can be configured to be equal to the height of the leg 114. In such configurations, if the edges of the skate blade end are perfectly aligned, then the top of the leg 114 would align with the squaring line 126. In some embodiments, a single squaring line can extend across the width of the face 123 rather than having a pair of squaring lines 126 arranged on opposite ends of the elongate member 122. In some embodiments, one or more horizontal lines with vertical indicators (or indicators spaced along the width of the face 123) or the like can be used instead of a plurality of vertically arranged indicia.

The indicia 128 can be located on the face 123 in addition to the squaring indicia 126 or as an alternative to the squaring indicia 126. The indicia 128 can be symmetrically arranged about the squaring line 126 and arranged on opposite ends of the elongated member 122. The squaring line 126 and/or indicia 128 can be used in conjunction with the measurement indicator 110 to determine a measurement or relative amount of imbalance between the edges of the blade end 104 as will be described hereinafter. The number, size, and/or shape of the graduations and squaring lines can vary. In some embodiments, the indicia 128 can be color-coded to indicate the relative squareness, evenness, or levelness of the skate edges of the blade end 104. For example, in one embodiment, the indicia 128 can be green, yellow, and red, based on the relative distance of the indicia from the squaring line 126. In some instances the indicia 128 can be shapes, such as circles or any other shapes, including holes or openings, whereby the amount that the indicator bisects these shapes indicates relative squareness of the sharpened blade edges.

The lines and other indicia 126, 128 need not provide an absolute measure of misalignment of the edges but can merely provide a qualitative assessment of misalignment and aid the user in correcting for the misalignment. For example, in some configurations, a skate sharpener may include a dial that adjusts a position of a grinding wheel relative to one or more clamping jaws and the reading from the skate blade measuring device 100 can aid in relative repositioning of the grinding wheel and the jaw. In one configuration, the reading from the device can assist a user in moving the grinding wheel in a correct direction relative to the jaws. In one configuration, the reading also can assist the user in moving a desired distance in the correct direction relative to the jaws. Other configurations also are possible.

Figure 2B:
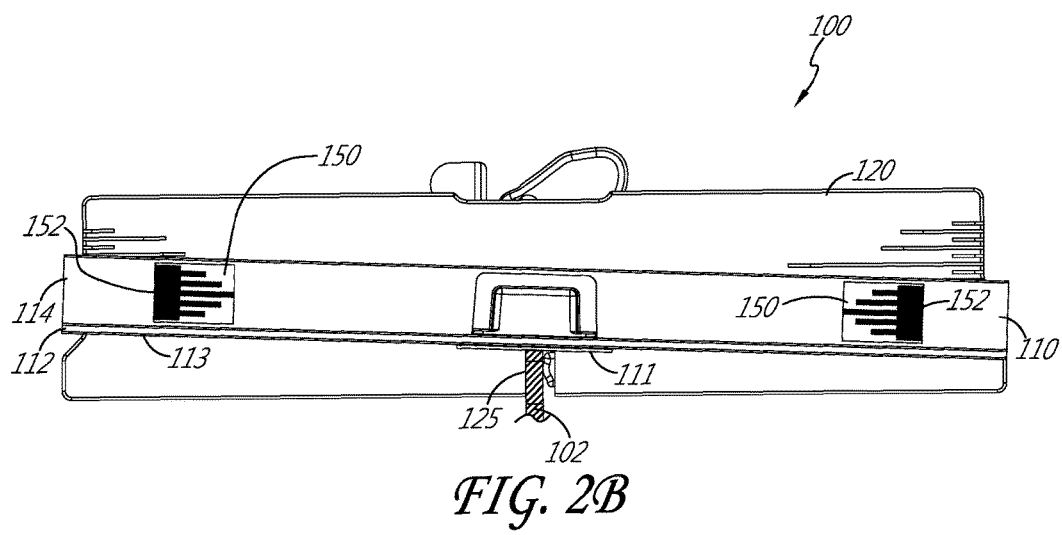
FIG. 2B illustrates a front view of another embodiment of a skate blade measurement device mounted on a skate blade.

In some embodiments, such as illustrated in FIG. 2B, the measurement indicator 110 can include measurement reference indicators 150 positioned on the leg 114. The measurement reference indicators 150 can include a plurality of graduations 152 that can serve as references for the severity of the measurement. In some embodiments, the measurement reference indicators 150 may be affixed to the measurement indicator 110 by an adhesive. The measurement reference indicators 150 can help to provide guidance to the user, such as when the indicia 128 on the squaring frame 120 are a uniform color, such as black or white as some non-limiting examples.

Figure 2C:
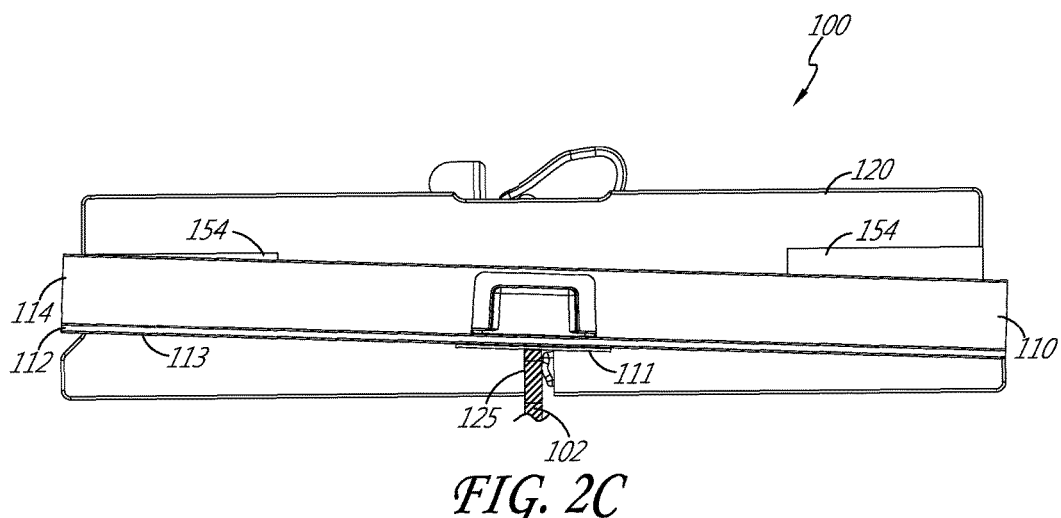
FIG. 2C illustrates a front view of yet another embodiment of a skate blade measurement device mounted on a skate blade.

In some embodiments, such as illustrated in FIG. 2C, the squaring frame can include a measurement zone 154. The measurement zone 154 can be configured to indicate when the squareness, evenness, or levelness of the edges of the skate blade are within a zone of acceptability. The size, shape, and number of measurement zones 154 can vary. In some embodiments, a single zone 154 can extend across the entire width of the squaring frame 120. The size of the measurement zone is configured to indicate when the measurement of the edges of the skate blade is within an acceptable tolerance. The use of a zone of acceptability can help facilitate quick measurements and help a user determine whether the edges of the skate blade require additional sharpening. In some embodiments, the zone 154 can be included in addition to measurement indicia 126, 128. In such an embodiment, the measurement indicia 126, 128 may be overlaid on a measurement zone 154. In some embodiments, one or more measurement zones 154 can be used as an alternative to measurement indicia 126, 128. In some embodiments, the squaring frame may include a plurality of zones, indicating varying degrees of alignment of the edges of the skate blade.

In some embodiments, the back face 130 of the elongate member 122 can include mounting members 132 and protrusions 133. The mounting members 132 include a measurement indicator mounting slot 134 having a defined height and width. The height and width of the measurement indicator mounting slot 134 can be sized and shaped to receive at least a portion of the leg 114 of the measurement indicator 110. The measurement indicator mounting slots 134 can be spaced apart a defined width from the back face 130 of the elongate member 122.

The width of the spacing can be configured to accommodate the magnet housing 116, such that the top face of the magnet housing is positioned adjacent the back face 130 of the elongate member 122 when the measurement indicator 110 is positioned in the backside storage position. Moreover, in the illustrated configuration, the supporting members 133 guide the measurement indicator 110 into the backside storage position. In other words, once the magnet 118 and/or magnet housing 116 is properly positioned between the supporting members 133, the measurement indicator 110 is pulled into the backside storage position under the influence of magnetic forces.

The height of the measurement indicator mounting slots 134 can be configured such that the front face of the measurement indicator 114 is adjacent a top face 136 of the elongate member 122. Additionally, a recess or indent 137 in the top face 136 of the elongate member 122 can be sized and configured to accommodate a portion of the magnet housing 116 such that the front face of the measurement indicator 114 is adjacent a top face 136 of the elongate member 122.

Figure 4:
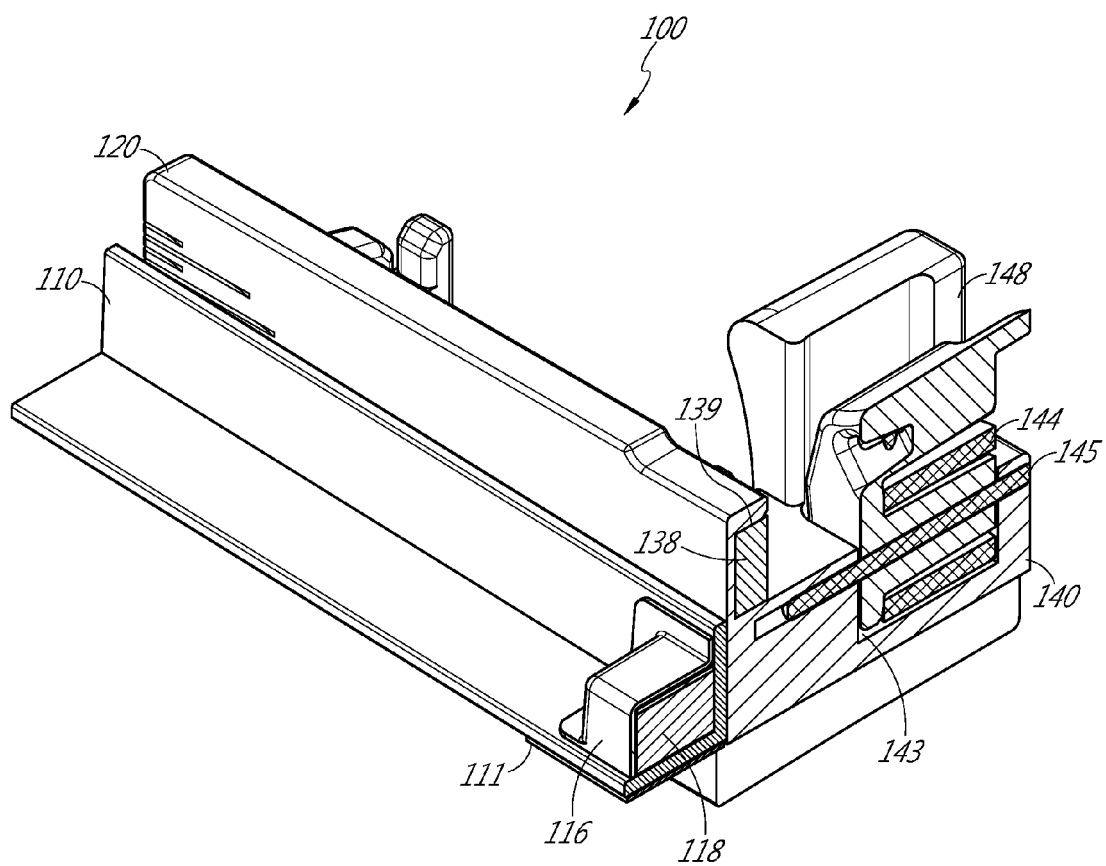
FIG. 4 illustrates a cross section view of the embodiment of the skate blade measurement device.

With specific reference to FIG. 4, the elongate member 122 can include a ferromagnetic portion or slug 138. The ferromagnetic portion can be positioned within a cavity 139 of the elongate member 122. The cavity 139 can have an opening on the back face 130 and can extend at least partially through the thickness of the elongate member 122. In some embodiments, the cavity 139 may extend entirely through the elongate member 122. The cavity 139 can be formed during manufacture of the squaring frame 120, such as during a casting or other manufacturing process. In some embodiments, the cavity 139 can be formed by milling or otherwise forming a hole in back face 130 of the elongate member 122. The ferromagnetic portion 138 can be affixed within the cavity using known processes, such as an adhesive or interference or snap fits, for example but without limitation, such that the slug 138 cannot be easily removed. The ferromagnetic portion 138 can be sized and configured to be flush with the back face 130 of the elongate member 122 when positioned within the cavity 139. The ferromagnetic portion 138 can be steel, iron, or another ferromagnetic material. In some embodiments, a magnet can be affixed within the elongate member 122 in place of a ferromagnetic portion. The ferromagnetic portion 138 can be configured to locate the measurement indicator 110 in a storage position, such as, for example, a backside storage position or a front side storage position. Specifically, the position of the ferromagnetic portion 138 can be configured such that when the measurement indicator 110 is located within a relative proximity of the storage position, the magnetic force exerted by the magnet 118 on the ferromagnetic portion can maintain the measurement indicator 110 in the storage location. The magnetic force exerted by the magnet 118 on the ferromagnetic portion 138 can be sufficient to maintain the measurement indicator 110 in the defined storage location, such as the front side storage location. The size and shape of the ferromagnetic portion 138 can be configured to define the storage locations on the elongate member 122. In the illustrated embodiment, the storage location is located substantially in the center of the elongate member 122. However, in other embodiments, the ferromagnetic portion can be sized and configured to move the storage location to another defined location on the squaring frame 120. In some embodiments, the squaring frame may be configured to have a single storage location, such as only a front side storage location or a backside storage location.

The position of the ferromagnetic portion 138 can be configured such that when the measurement indicator 110 is located in the usage position, the magnetic force exerted on the skate blade 102 by the magnet is greater than the magnetic force exerted by the magnet 118 on the ferromagnetic portion 138. The size and shape of the magnet 118 and/or the ferromagnetic portion 138 can be configured to reduce the magnetic force exerted by the magnet 118 on the ferromagnetic portion 138 when the measurement indicator is in the usage position. Preferably, the magnetic force exerted by the magnetic portion 118 on the ferromagnetic portion 138 is not sufficient to adversely affect the measurement of the skate blade edges on the blade end 104 by the measurement indicator 110. For example, when in the usage position the magnetic force exerted on the ferromagnetic portion 138 is such that the magnetic force does not alter the position of the measurement indicator 110. In some configurations, such as where the ferromagnetic portion 138 is formed by a magnetic member, the polarity of the magnets 118, 138 can be chosen such that, in the storage position, the magnets attract and, in the measuring position, the magnets repel.

Figure 3:
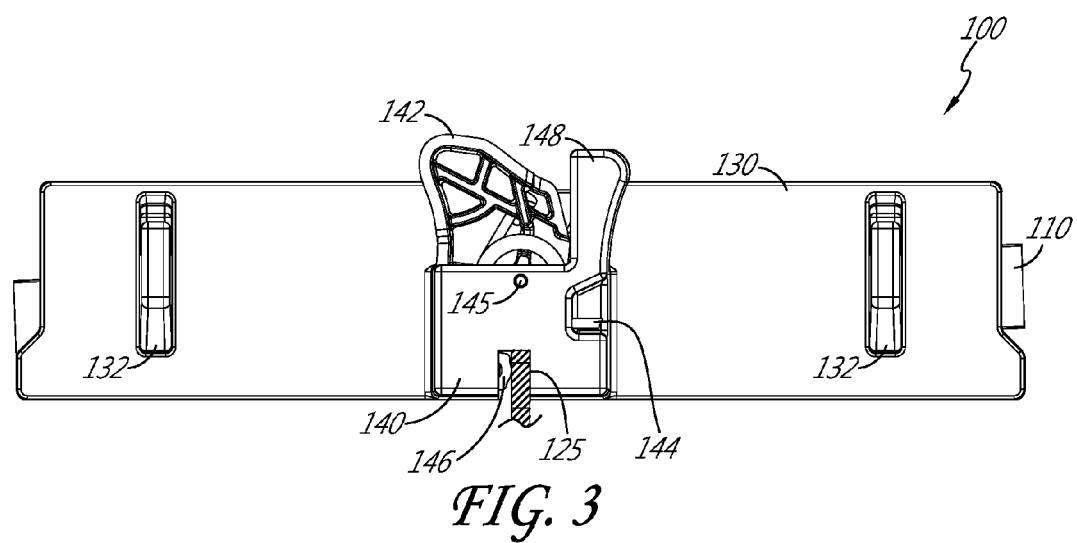
FIG. 3 illustrates a back view of the embodiment of the skate blade measurement device mounted on the skate blade.
Figure 9:
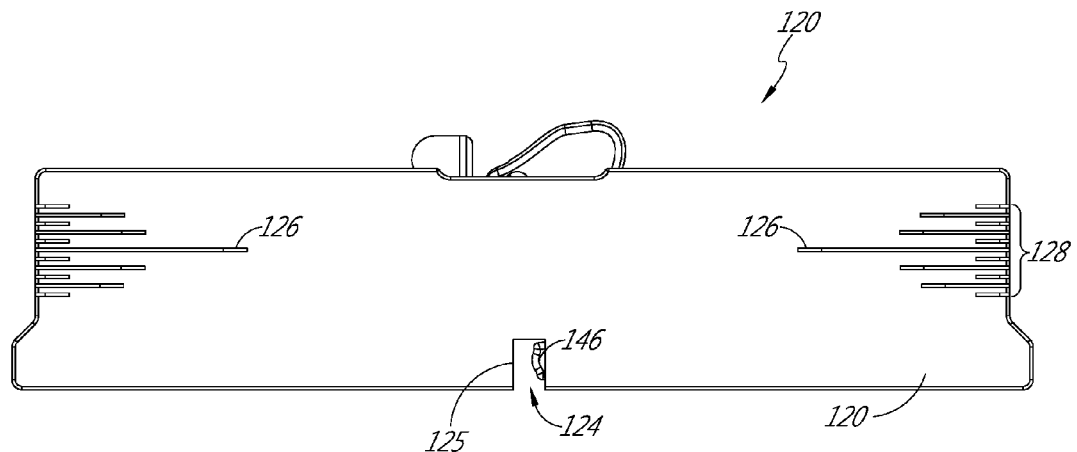
FIG. 9 illustrates a front view of the embodiment of the squaring frame.
Figure 10:
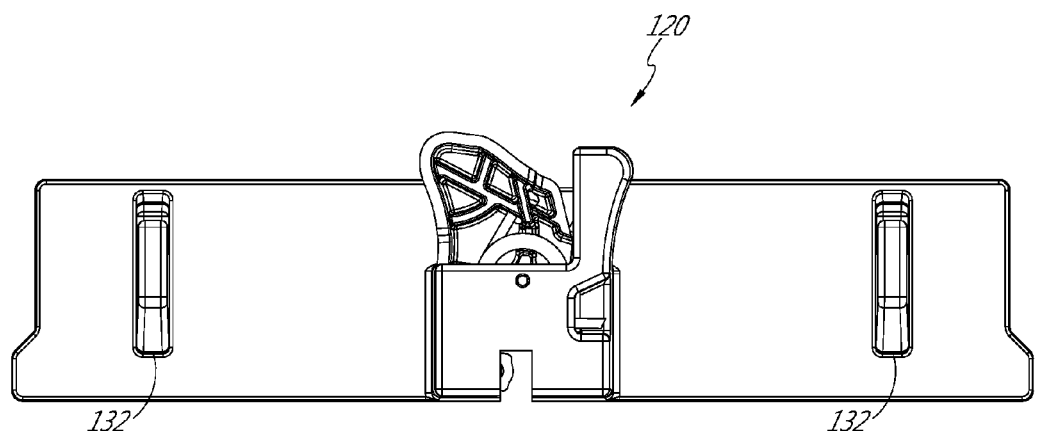
FIG. 10 illustrates a back view of the embodiment of the squaring frame.
Figure 11:
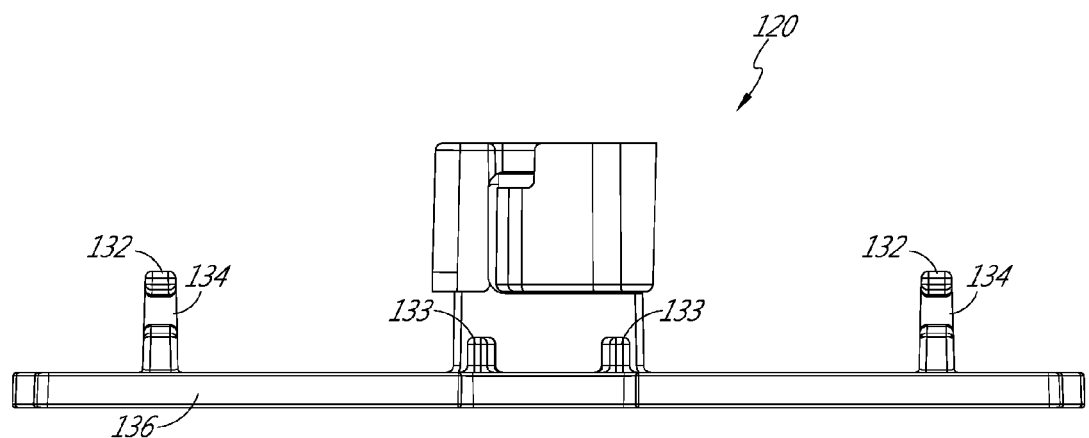
FIG. 11 illustrates a top view of the embodiment of the squaring frame.
Figure 12:
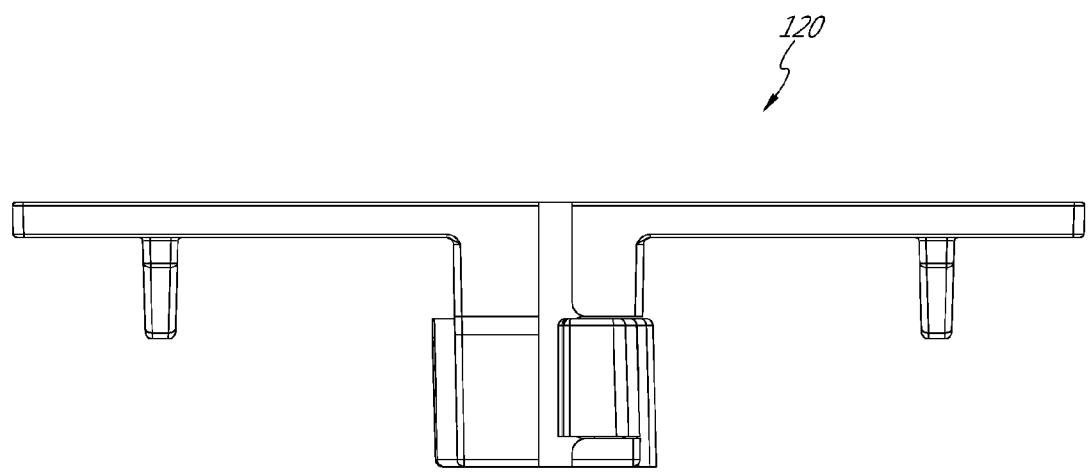
FIG. 12 illustrates a top view of the embodiment of the squaring frame.
Figure 13:
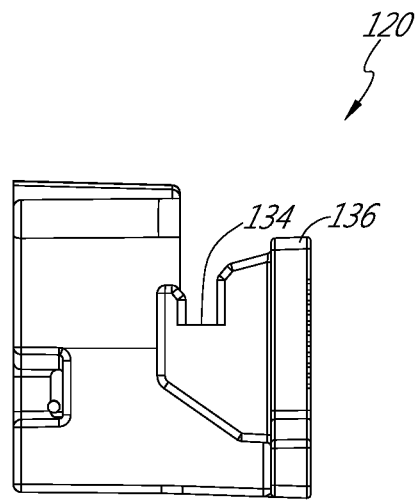
FIG. 13 illustrates a side view of the embodiment of the squaring frame.
Figure 14:
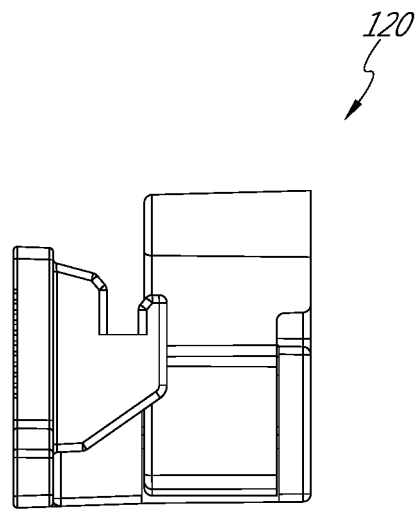
FIG. 14 illustrates an opposite side view of the embodiment of the squaring frame.
Figure 15:
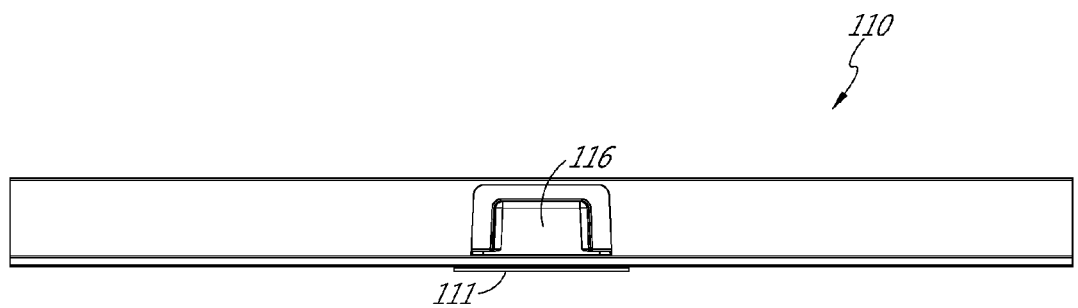
FIG. 15 illustrates a front view of the embodiment of the measurement indicator.
Figure 16:
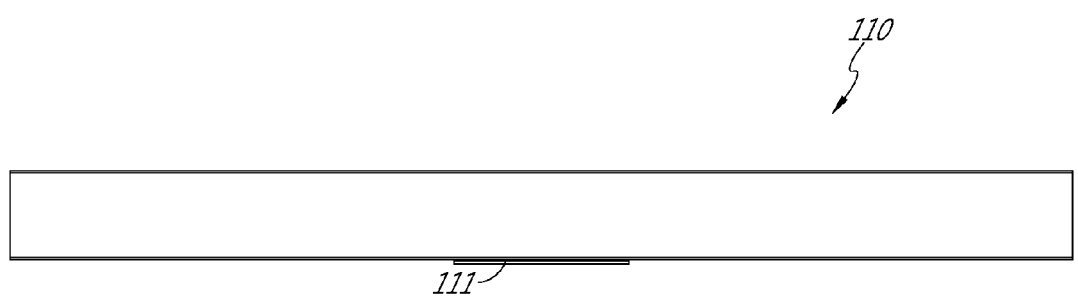
FIG. 16 illustrates a back view of the embodiment of the measurement indicator.
Figure 17:
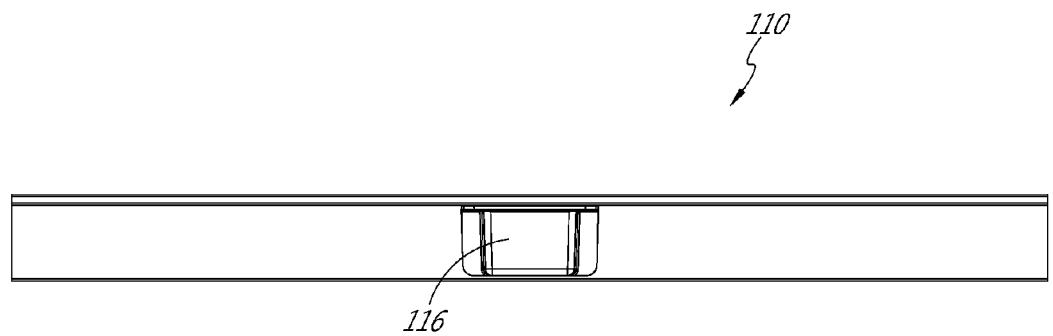
FIG. 17 illustrates a top view of the embodiment of the measurement indicator.
Figure 18:
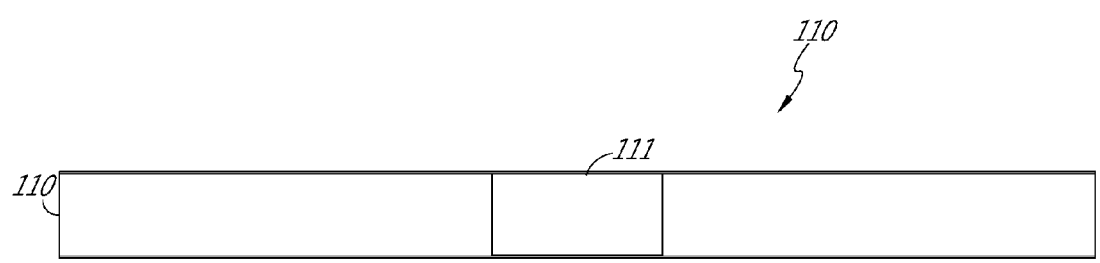
FIG. 18 illustrates a bottom view of the embodiment of the measurement indicator.
Figure 19:
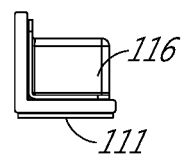
FIG. 19 illustrates a side view of the embodiment of the measurement indicator.
Figure 20:
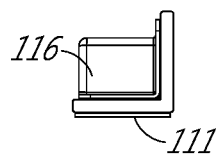
FIG. 20 illustrates an opposite side view of the embodiment of the measurement indicator.

With specific reference to FIGS. 3, 4, and 9, an embodiment of the frame body 140 is illustrated. The frame body 140 includes a skate blade coupling mechanism configured to releasably couple the squaring frame 120 to the skate blade 102. Any suitable mechanism, assembly or component(s) can be used to secure the frame body 140 to the skate blade. In the illustrated embodiment, the frame body 140 includes a lever body 142, a spring 144, a mounting pin 145, a skate engagement foot 146, and an arm 148. The lever 142 and skate engagement foot 146 can formed from a single unit or body. The lever 142 can be inserted within a cavity 143 formed within the frame body 140. The spring 144 can be positioned within the lever 142. The lever 142 and the spring 144 can be configured to be positioned within the cavity 143. The mounting pin 145 can secure the lever 142 and the spring 144 within the cavity 143. The spring 144 can be configured to bias the skate engagement foot 146 into an engagement position 124. The spring 144 can be a torsional spring. When the lever 142 is actuated, such as moved toward the arm 148, the skate engagement foot 146 can move to a disengaged position, thereby allowing a skate blade to be positioned within the slot 124. When the lever 142 is released the skate engagement foot 146 engages the skate blade 102 within the slot 124.

The skate engagement mechanism is configured to position the skate blade 102 adjacent and parallel to wall 125 of slot 124. The skate engagement foot 146 can be configured with a rounded or contoured surface in order to provide an engagement force that is substantially normal to the surface of the skate blade 102. In such an embodiment, the blade mounting foot 146 can be configured to accommodate different thickness skate blades while maintaining sufficient force to properly position the skate blade 102 against the wall 125 of slot 124. The spring 144, the blade mounting foot 146, and the slot 124 can be configured to maintain the position of squaring frame 120 in position relative to the skate blade 102 during use. The engagement of the skate blade 102 within the slot 124 can be configured such that the squaring frame 120 is movable along the length of the skate blade 102 without disengaging the skate blade 102 from the slot 124. This can be beneficial to allow the user to take measurements of a plurality of locations along the skate blade 102 without having to remove the squaring frame 120 from the skate blade 102 or requiring realignment of the squaring frame 102 on the skate blade 102. Moreover, in the illustrated configuration, as shown in FIG. 5, the lever 142 and the arm 148 can be manipulated even with the measurement indicator 110 in the storage position. Such as configuration facilitates one handed operation and mounting of the frame body 140 on the skate blade 102 without having to remove the measurement indicator 110 from the stored position before mounting of the frame body 140 on the skate blade 110.

While the illustrated configuration employs the spring-biased lever and mounting foot configuration described directly above, other configurations can be used to secure the squaring frame 120 in position relative to the skate blade 102. For example, in some configurations, one or more threaded member(s) can be used to clamp the squaring frame 120 in position relative to the skate blade 102. In some configurations, one or more magnetic member can be used to secure the squaring frame to the skate blade 102. Any suitable configuration can be used keeping in mind a desire to provide a reference surface that serves to locate a datum surface or indicator or indicia against which the evenness, levelness, or squareness of the two sharpened edges can be checked.

Usage of the Measurement Device

FIGS. 1-3 illustrate an exemplary use of the skate blade measuring device 100. Prior to usage, the measurement indicator 110 can be positioned in the storage position, such as, for example, the backside storage position (as illustrated in FIGS. 5 and 6) or the front side storage position (as illustrated in FIG. 7). The storage position can be defined as a position that does not allow proper measuring or checking without removal from that position.

The squaring frame 120 can be mounted to the skate blade 102. The skate blade 102 can be releasably positioned within the slot 124. In some configurations, the skate blade 102 can be positioned against the face 125 of the slot. The squaring frame 120 can be mounted to the blade 102 such that the blade 102 is positioned within the slot 124 with the top of slot adjacent the blade edges formed on the blade end 104. In the illustrated configuration, the blade mounting foot 146 can abut the skate blade and can be configured to hold the squaring frame 120 into position relative to the skate blade 102.

After the blade 102 is positioned within the slot 124, the measurement indicator 110 can be moved from one of the storage positions and positioned on the blade edge 102 and adjacent to or near to the face 123 of the squaring frame 120.

In certain configurations, a gap is maintained between the measurement indicator 110 and the squaring frame 120 to reduce the likelihood of friction between the two components 110, 120 influencing the measurement. In certain preferred configurations, the gap can be on the order of 1-3 mm. In some configurations, a repulsive magnet force can be used to assure the gap.

The magnet 118 of the measurement indicator 110 can exert a magnetic force on the skate blade 102 to secure the measurement indicator 110 on the edges of the end 104 of the skate blade 102. Once the measurement indicator 110 is positioned adjacent to the face 123, the free edge 115 of the leg 114 (or some other reference portion, such as a slot or the like) can be compared to the squaring line(s) 126 and/or indicia 128. The squaring frame 120 and the measurement indicator 110 can be moved longitudinally along the blade. Measurements can be taken at one or more locations along the skate blade 102 without fully removing the squaring frame 120 from the skate blade 102. For example, the user may take measurements at two or more locations along the skate blade.

FIGS. 1, 2A, and 2B illustrate a sample measurement. In practicing the measurement method, the squaring line 126 and/or other indicia 128 can provide a datum for comparison with the top edge 115 of the measurement indicator 110, for example but without limitation. In some configurations, the squaring line 126 can be sufficiently thick from top to bottom such that a misalignment between the measurement indicator 110 and the squaring frame 120 that results in less than the full length of the squaring line 126 being visible indicates edges of the end 104 of the blade that need addressed while more subtle misalignments that still allow the full length of the squaring line 126 to be viewed indicates edges of the end 104 that are not exactly aligned but that are within a suitable tolerance of aligned. In some configurations, however, visual comparison of the top edge 115 to the squaring line 126 can show a position of the top edge 115 relative to the squaring line(s) 126 and/or the indicia 128. The visual comparison can be used to determine the number of indicia between the standard squaring line 126 and the top edge 115 for each side of the squaring frame.

In the illustrated embodiment, the top edge 115 shows an approximate difference of two indicia below the squaring line 126 on the right side and two indicia above the squaring line 126 on the left side. Each of the indicia 128 can represent an incremental measurement value for squareness of the skate blade edges formed on the blade end 104. The total measurement of squareness can be determined by adding the total number of indicia. In this example, the top edge 115 indicates the edges of the blade end 104 are out of squareness by two increments. When perfectly square, the top edge 115 should align with squaring line 126. The relationship between each of the indicia 128 and the level of out of squareness is determined by the specific geometry and dimensions of the squaring frame 120 and measurement indicator 110.

Although a specific embodiment is illustrated, other embodiments may be utilized to test the squareness of skate blades. For example, a wider device may be utilized or a different dimensioned measurement indicator 110 and distance between the squaring line 126 and the top of the slot 124 can be employed.

The measurement indicator 110 can be positioned in the storage position when the measurement device is not in use. Desirably, the storage position is a position in which the measurement indicator 110 can remain connected to the squaring frame 120 while not interfering with mounting of the squaring frame 120 to the skate blade 102. The storage position also is a position that requires movement of the measurement indicator 110 from the storage position for use in checking the edges of the end of the skate blade. Example embodiments of storage positions include the backside storage position illustrated in FIGS. 5 and 6 and the front side storage position illustrated in FIG. 7. Different embodiments can use different storage positions. In the illustrated backside storage position, the leg 114 of measurement indicator 110 can be positioned within the measurement indicator mounting slots 134. The measurement indicator can positioned such that the top face of the magnet housing 116 is positioned adjacent the back face 130 of the elongate member 122. In some embodiments, the elongate member can include supporting members 133 that can support the measurement indicator 110 in the backside storage position. The measurement indicator mounting slots 134 can be configured such that the front face of the measurement indicator 114 is adjacent a top face 136 of the elongate member 122. Additionally, a recess or indent 137 in the top face 136 of the elongate member 122 can be sized and configured to accommodate a portion of the magnet housing 116 such that the front face of the measurement indicator 114 is adjacent a top face 136 of the elongate member 122. The ferromagnetic portion 138 can be positioned within the squaring frame to locate and secure the measurement indicator 110 in the backside storage position. In the illustrated front side storage position, the measurement indicator 110 can be positioned on the front face 123 of the elongate member 122. The measurement indicator 110 can be moved from the usage position to the front side storage position by moving the measurement indicator vertically along the face 123 of the elongate member 122. The magnetic force exerted by the magnet 118 on the ferromagnetic portion 138 can be sufficient to maintain the measurement indicator 110 in the front side storage location after the measurement indicator 110 has been positioned in the storage location by the user.

Preferably, the squaring frame 120 and measurement indicator 110 are manufactured from non-ferrous materials, such as aluminum or a suitable non-metal or plastic material. In this manner, the magnet 118 can be optimally attached to the blade end 104 or the ferromagnetic portion 138. Further, attraction of the magnet 118 to the squaring frame 120 can be avoided, as such an attraction can interfere with leveling of the measurement indicator 110. Additionally, the squaring frame 120 and measurement indicator 110 can be constructed of a material of sufficient strength to be readily machined to tight tolerances to maintain the parallel and square or perpendicular relationships described above. Any material having sufficient strength and machinability or forming properties to achieve the disclosed relationships is adaptable for use with the present invention.

While various embodiments of the invention have been particularly shown and described, it will be understood by those skilled in the art that various changes in form and details may be made therein without departing from the spirit and scope of the invention as defined by the appended claims.

What is claimed is:

1. An ice skate blade edge measurement device comprising a first portion and a second portion that is removably connectable to the first portion;

the first portion providing a storage region and a reference relative to a vertical portion of a skate blade when in use, the second portion being removably positionable within the storage region of the first portion when not in use for providing a measurement such that the first and second portions can be moved around together when not in use for providing a measurement, and the second portion providing a reference relative to a pair of sharpened edges of the skate blade when separated from the first portion and placed onto the pair of sharpened edges when in use for providing a measurement.

2. The ice skate blade edge measurement device of claim 1, wherein the second portion is able to be secured in position in the storage region of the first portion when the second portion is not in use for providing a measurement.

3. The ice skate blade edge measurement device of claim 2, wherein the second portion is secured in position in the storage region of the first portion using at least one coupling component.

4. The ice skate blade edge measurement device of claim 3, wherein the coupling component is magnetic.

5. The ice skate blade edge measurement device of claim 1, wherein the second portion nests onto the first portion in the storage region.

6. The ice skate blade edge measurement device of claim 1, wherein the first portion can be mounted to the skate blade for use while the second portion is secured in the storage region.

7. The ice skate blade edge measurement device of claim 6, wherein the second portion is removed from the first portion and positioned apart from but adjacent to the first portion when in use for measuring alignment of the pair of sharpened edges of the skate blade.

8. The ice skate blade edge measurement device of claim 1, wherein the storage region of the first portion is a long term storage region and the first portion also comprises a second storage region that is a short term storage region, the short term storage region being defined solely by a magnetic or ferromagnetic region and the long term storage region being defined by at least one or more mechanical members.

9. The ice skate blade edge measurement device of claim 8, wherein the long term storage region also is defined by at least one magnetic or ferromagnetic region.

10. The ice skate blade edge measurement device of claim 1, wherein the first portion comprises an attachment portion that is used to removably connect the first portion to the skate blade in use such that a surface of the first portion abuts a side surface of the skate blade.

11. The ice skate blade edge measurement device of claim 1, wherein the first portion comprises at least one indicia and, when in use, relative alignment of the second portion and the indicia indicates a degree of alignment between the pair of sharpened edges of the skate blade.

12. An ice skate blade edge measurement device comprising:
a measurement device frame comprising:
a skate blade mount configured to releasably couple the measurement device frame to a vertical surface of an ice skate blade in use;
an elongate member connected to the skate blade mount, the elongate member having at least one measurement indicia, the at least one measurement indicia being configured to provide an indication of relative alignment between a pair of sharpened ice skate blade edges of the ice skate blade when a measurement indicator is positioned in a measurement position relative to the at least one measurement indicia; the measurement indicator comprising a magnet, the magnet being configured to magnetically position the measurement indicator on the pair of sharpened ice skate blade edges of the ice skate blade during measurement; and the measurement device frame comprising a storage region and the measurement indicator being removably connectable to the measurement device frame in the storage region when not in use during measurement.

13. The ice skate blade edge measurement device of claim 12, wherein the measurement device frame comprises a ferromagnetic portion positioned at a first location on the measurement device frame and wherein the magnet of the measurement indicator is positioned such that, when the measurement indicator is positioned in the storage region, the magnet of the measurement indicator and the ferromagnetic portion of the measurement device frame are magnetically attracted to one another.

14. The ice skate blade edge measurement device of claim 12, wherein the measurement indicator comprises a first leg and a second leg, the first leg being perpendicular to the second leg, wherein:
when in a measurement position, the first leg of the measurement indicator is positioned adjacent to, but spaced apart from, the elongate member and the second leg abuts the pair of sharpened ice skate blade edges of the ice skate blade and, when in the storage position, the first leg is positioned adjacent to the elongate member and the second leg is spaced apart from the pair of sharpened ice skate blade edges of the ice skate blade.

15. The ice skate blade edge measurement device of claim 14, wherein the first leg of the measurement indicator is positioned adjacent to a forward surface of the elongate member when the measurement indicator is in the storage position.

16. The ice skate blade edge measurement device of claim 14, wherein the first leg of the measurement indicator is positioned adjacent to a rearward surface of the elongate member when the measurement indicator is in the storage position.

17. The ice skate blade edge measurement device of claim 14, wherein the measurement device frame further comprises one or more support members positioned on a backside of the elongate member, the one or more support members defining slots configured to receive a first leg of the elongate member, and wherein in the storage position the first leg is positioned within the slots and the second leg is positioned adjacent a portion of the elongate member.

18. The ice skate blade edge measurement device of claim 12, wherein the blade mount comprises a skate engagement foot configured to engage the skate blade within a slot of the blade mount.

19. A method comprising:
releasably coupling a measurement device frame to an ice skate blade, the measurement device frame comprising at least one measurement indicia and a storage location for a measurement indicator;
removing the measurement indicator from the storage location on the measurement device frame; and
magnetically positioning the measurement indicator on a skate blade edge of the ice skate blade with a magnet disposed on the measurement indicator, wherein the measurement indicator is positioned relative to the at least one measurement indicia on the measurement device frame and wherein a measurement of the ice skate blade edge is based, at least in part, on a location of the measurement indicator relative to the at least one measurement indicia of the measurement device frame.

20. The method of claim 19 further comprising returning the measurement indicator to a storage located on the measurement device frame by bringing into magnetic connection the magnet of the measurement indicator and a ferromagnetic component of the measurement device frame.

21. The method of claim 20 further comprising magnetically positioning the measurement indicator at a second storage location, wherein the second storage location is based at least in part on a magnetic attraction between the magnet and the ferromagnetic component, wherein the second storage location is different from the first storage location.

* * * * *